US009521618B2

United States Patent
Kim et al.

(10) Patent No.: US 9,521,618 B2
(45) Date of Patent: Dec. 13, 2016

(54) DISCOVERY METHOD AND APPARATUS FOR DEVICE TO DEVICE COMMUNICATION IN CELLULAR MOBILE COMMUNICATION SYSTEM

(71) Applicant: Electronics and Telecommunications Research Institute, Daejeon (KR)

(72) Inventors: Dae Ik Kim, Daejeon (KR); Jee Hyeon Na, Daejeon (KR); Jung Mo Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 154 days.

(21) Appl. No.: 14/097,870

(22) Filed: Dec. 5, 2013

(65) Prior Publication Data

US 2014/0162671 A1 Jun. 12, 2014

(30) Foreign Application Priority Data

Dec. 6, 2012 (KR) .......................... 10-2012-0140766

(51) Int. Cl.
*H04W 72/00* (2009.01)
*H04W 52/02* (2009.01)
*H04W 4/06* (2009.01)
*H04W 4/00* (2009.01)

(52) U.S. Cl.
CPC ......... *H04W 52/0212* (2013.01); *H04W 4/005* (2013.01); *H04W 4/06* (2013.01)

(58) Field of Classification Search
USPC .................................... 455/509, 452.1; 726/7
See application file for complete search history.

(56) References Cited

U.S. PATENT DOCUMENTS

| 2013/0005377 A1* | 1/2013 | Wang ............... H04W 72/0406 455/509 |
| 2013/0160101 A1* | 6/2013 | Hakola ............... H04W 76/023 726/7 |

FOREIGN PATENT DOCUMENTS

KR 1020120100833 A 9/2012

* cited by examiner

*Primary Examiner* — David Q Nguyen
(74) *Attorney, Agent, or Firm* — Nelson Mullins Riley & Scarborough LLP; Anthony A. Laurentano (57) ABSTRACT

Disclosed is a discovery method and apparatus for device-to-device (D2D) communication in a cellular mobile communication system. The discovery method performed by the discovery apparatus may include obtaining, from a server managing information associated with terminals providing a service using a D2D communication scheme over a mobile communication network, information associated with a service provided by the terminals, selecting a service of interest based on the information associated with the service, receiving, from a base station, information associated with a discovery radio resource allocated to the terminals providing the service of interest, and discovering the terminals providing the service of interest based on the information associated with the discovery radio resource.

15 Claims, 5 Drawing Sheets

DISCOVERY METHOD AND APPARATUS FOR DEVICE TO DEVICE COMMUNICATION IN CELLULAR MOBILE COMMUNICATION SYSTEM

CROSS-REFERENCE TO RELATED APPLICATION

This application claims priority to and benefit of Korean Patent Application No. 10-2012-0140766, filed on Dec. 6, 2012, in the Korean Intellectual Property Office, the disclosure of which is incorporated herein by reference.

BACKGROUND

1. Field of the Invention

Exemplary embodiments relate to a method and apparatus for discovering a device-to-device (D2D) service provider for D2D communication using a mobile communication network in a cellular mobile communication system.

2. Description of the Related Art

Recently, with the rapid spread of a mobile communication device capable of providing a variety of new services, for example, a smart phone, a smart pad, a tablet, and the like, an amount of data traffic in a cellular mobile communication system is increasing sharply. Also, it is anticipated that traffic of transmission to a base station will increase beyond a current capacity of the base station as a new mobile market is vitalized in man-to-machine communication and machine-to-machine (M2M) communication beyond person-to-person communication.

Accordingly, to improve performance of an existing mobile communication network at a reduced cost, direct communication between cellular mobile communication devices based on proximity or device-to-device (D2D) communication based on proximity is contemplated. A D2D communication technology using a cellular mobile communication system may reduce overall traffic of a cellular mobile communication network as well as a radio resource usage by transmitting data traffic between devices directly without relaying of a base station.

As one of the technologies for D2D communication, reference may be made to Korean Patent Publication No. 10-2012-0100833, published on Sep. 12, 2012, titled "Method of executing direct communication between terminals and terminal for supporting the same", in which a direct communication is executed between a first terminal and a second terminal using a common direct communication resource that is commonly allocated to all cells and has a fixed size and position.

A D2D service based on proximity may be contemplated on various scenarios. The D2D service is largely classified into a D2D service under the control of a base station over a cellular mobile communication network and a D2D service without control of a base station for public safety in a region in which communication with the base station is impossible due to a natural disaster and other reasons. As a D2D service under the control of a base station, consideration may be given to a service for providing a D2D communication between two terminals aware of one another, such as, for example, a D2D service for providing continuity of a service by switching from cellular communication to D2D communication when two terminals communicating with one another get closer and a D2D service for searching for a friend adjacent to a user and establishing connection via D2D, and a service for providing a D2D communication between terminals having no previously set relation, such as, for example, a D2D regional advertising service or a D2D regional personal broadcasting service.

In this instance, a D2D service provider providing a D2D regional advertising service or a D2D regional personal broadcasting service may be plural within a service area of a base station, and a terminal that desires to receive a corresponding D2D service should have a capacity of discovering the corresponding service. However, in an environment in which a D2D regional advertising service provider or a D2D regional personal broadcasting service provider is plural and distributed dispersedly geographically, discovering many and unspecified service providers causes extremely high battery consumption.

Accordingly, there is a demand for a solution for improving efficiency of battery usage in a mobile terminal by discovering only a service in which a user is interested when discovering a D2D regional advertising service or a D2D regional personal broadcasting service provided by many and unspecified service providers in a cellular mobile communication system.

SUMMARY

An aspect of the present invention provides a discovery method and apparatus for device-to-device (D2D) communication in a cellular mobile communication system that may discover only a terminal of interest among terminals providing various services through D2D communication in the cellular mobile communication system.

Another aspect of the present invention also provides a discovery method and apparatus for D2D communication in a cellular mobile communication system that may reduce an amount of battery consumed in discovering a terminal providing various services through D2D communication in the cellular mobile communication system.

According to an aspect of the present invention, there is provided a discovery method performed by a discovery apparatus, the discovery method including obtaining, from a server managing information associated with terminals providing a service using a D2D communication scheme over a mobile communication network, information associated with a service provided by the terminals, selecting a service of interest based on the information associated with the service, receiving, from a base station, information associated with a discovery radio resource allocated to a terminal providing the service of interest, and discovering the terminal providing the service of interest based on the information associated with the discovery radio resource.

The discovery method may further include, before the obtaining, transmitting, to the server, a service information request message requesting the information associated with the service provided by the terminals.

The service information request message may include information associated with an identification (ID) of the base station and a category of the service of interest.

The information associated with the service may correspond to information associated with a service corresponding to the category of the service of interest among services provided through the base station corresponding to the ID of the base station.

The obtaining may be performed when a client for D2D communication included in the discovery apparatus is executed or when a request for obtaining the information associated with the service is input from a user.

The discovery method may further include, before the receiving, transmitting a discovery information request message in a form of a non-access stratum (NAS) message to the base station, the discovery information request message requesting the information associated with the radio resource allocated to the terminal providing the service of interest.

The discovery information request message may include information associated with an ID of the service of interest and a category of the service of interest, received from the server.

The discovery information request message may be transmitted from the base station to a mobility management entity (MME) managing a radio bearer for D2D communication between the terminals providing the service using the D2D communication scheme, and the MME may request the base station to provide the discovery apparatus with the information associated with the radio resource allocated to the terminal providing the service of interest, and the base station may transmit, to the discovery apparatus, the information associated with the radio resource allocated to the terminal providing the service corresponding to the ID of the corresponding service of interest.

The information associated with the radio resource may be received, in a case in which the discovery apparatus performs a handover from the base station to other base station, by the MME transmitting, to other base station, the information associated with the category of the service of interest included in the discovery information request message received from the base station, and by the base station transmitting, to the discovery apparatus, the information associated with the radio resource allocated to the terminal providing the service corresponding to the category of the service of interest.

The discovering may include discovering the terminal providing the service of interest by measuring proximity with the terminal providing the service of interest based on the information associated with the radio resource.

According to another aspect of the present invention, there is provided a method of allocating a radio resource, in which a radio resource for discovery is allocated to a terminal intended to provide a service using a D2D communication scheme over a mobile communication network, the method including enabling an ID to be allocated to a service by transmitting information associated with the service to a server managing information associated with terminals, enabling a discovery radio resource for discovery of the service to be allocated by a base station by transmitting the allocated ID of the service to the base station, and broadcasting a signal based on information associated with the allocated discovery radio resource.

According to still another aspect of the present invention, there is provided a discovery apparatus including an obtaining unit to obtain, from a server managing information associated with terminals providing a service using a D2D communication scheme over a mobile communication network, information associated with a service provided by the terminals, a selection unit to select a service of interest based on the information associated with the service, and a discovery unit to discover a terminal providing the service of interest based on information associated with a discovery radio resource allocated to the terminal providing the service of interest received from a base station.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
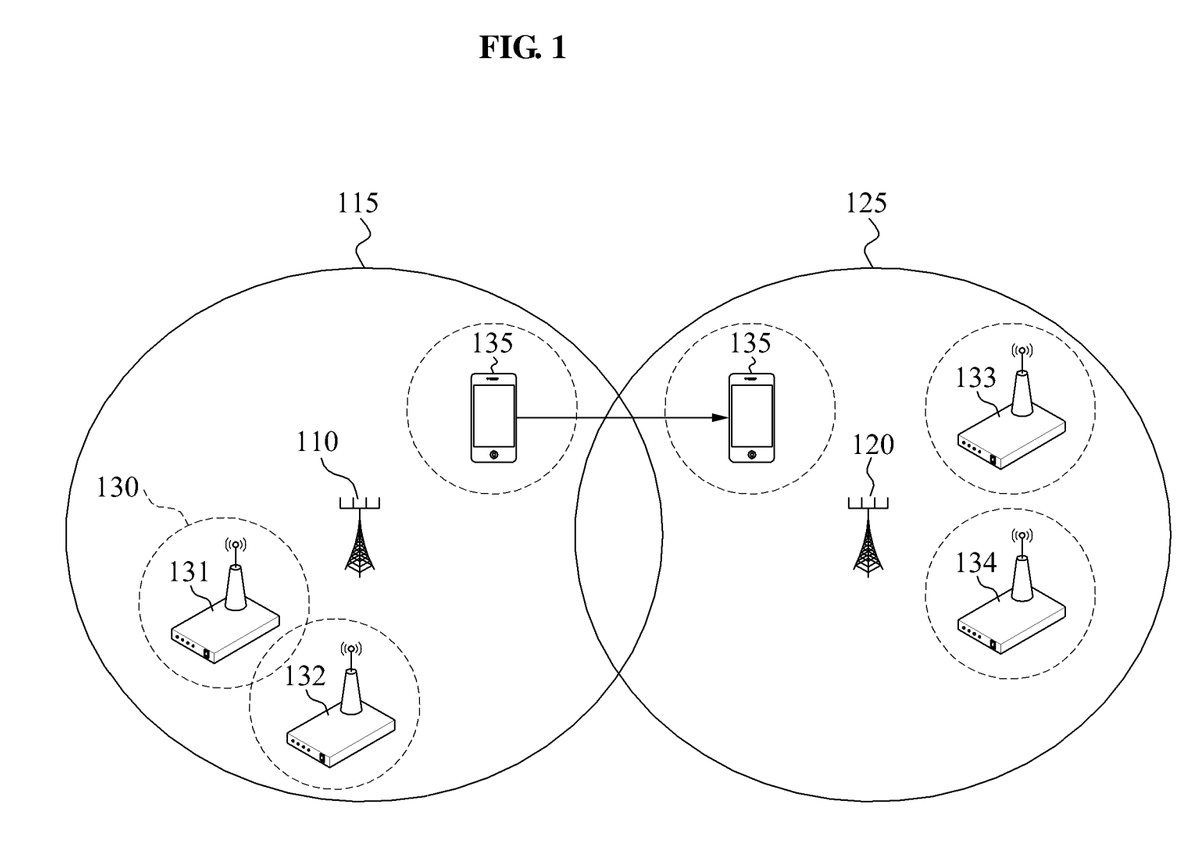
FIG. 1 is a diagram illustrating an example of a regional advertising service or a regional personal broadcasting service being provided using a device-to-device (D2D) communication scheme in a cellular mobile communication system.

FIG. 1 is a diagram illustrating an example of a regional advertising service or a regional private broadcasting service being provided using a device-to-device (D2D) communication scheme in a cellular mobile communication system.

The following description is provided with reference to FIG. 1, taking, as an example, a case in which a first terminal 131 advertising a bookstore, a second terminal 132 advertising a cafe are within a service area 115 of a first base station 110, a third terminal 133 advertising a restaurant and a fourth terminal 134 advertising a shopping mall are present within a service area 125 of a second base station 120, and a fifth terminal 135 providing a personal broadcasting service with mobility is mobile. Here, each of the first terminal 131, the second terminal 132, the third terminal 133, and the fourth terminal 134 may provide a service to a terminal located within an area 130 of the respective terminals using a D2D communication scheme at a fixed location, and the fifth terminal 135 may provide a D2D service to a terminal located within an area of the fifth terminal 135 while mobile. For example, the fifth terminal 135 may provide a service for regional news, music, a film, a social network, and the like. In this instance, the service area 130 may differ for each of the terminals 131~135.

For example, when the fifth terminal 135 having mobility moves from the service area 115 of the first base station 110 to the service area 125 of the second base station 120 as shown in FIG. 1, a base station serving the fifth terminal 135 may be changed from the first base station 110 to the second base station 120. However, even though the base station serving the fifth terminal 135 is changed with the movement of the fifth terminal 135, a service being provided by the fifth terminal 135, for example, regional advertising or personal broadcasting, may be provided continuously.

The services provided by the first through fifth terminals 131~135 may be provided by the corresponding terminals 131~135 through D2D communication when a receiving terminal that desires to receive a corresponding service is approximate to a terminal providing the corresponding service. For this, the receiving terminal may perform discovery for the corresponding service beforehand. However, when the receiving terminal performs discovery for all services in an environment in which the terminal providing the service is plural and distributed dispersedly geographically, extremely high battery consumption may result. Accordingly, it is necessary to reduce battery consumption by performing discovery only for a service desired by a user. For example, when a user of a receiving terminal is interested in advertising a café and a restaurant, there is a need for a method of performing discovery for the corresponding service, but not performing discovery for the other services, for example, advertising a bookstore and a shopping mall.

Figure 2:
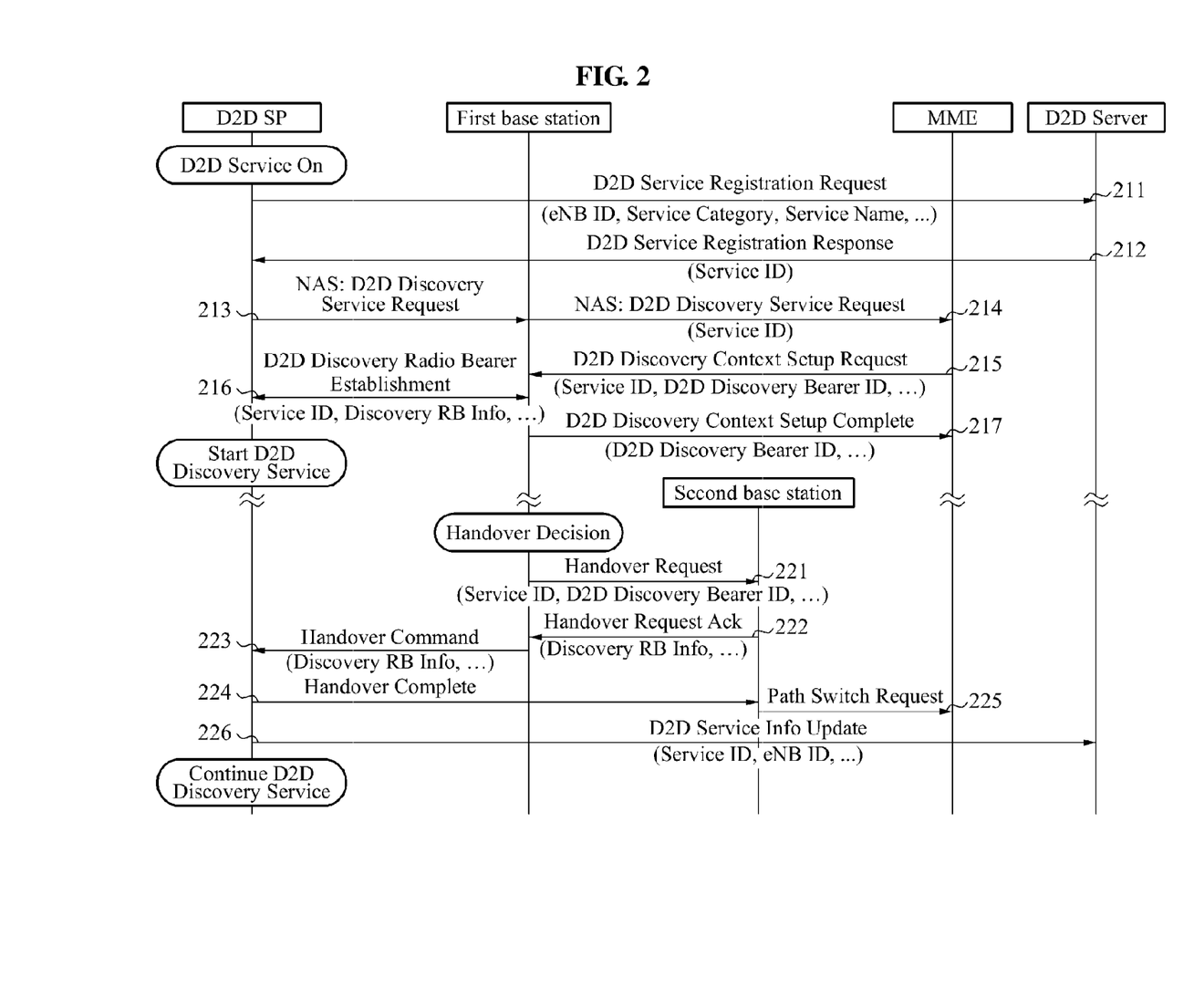
FIG. 2 is a diagram illustrating a procedure for registering a service and enabling a D2D discovery radio resource to be allocated to a D2D service provider and a procedure for maintaining a service when a handover occurs, in a cellular mobile communication system according to an exemplary embodiment.

FIG. 2 is a diagram illustrating a procedure for registering a service and enabling a D2D discovery radio resource to be allocated to a D2D service provider and a procedure for maintaining a service when a handover occurs, in a cellular mobile communication system according to an exemplary embodiment.

As shown in FIG. 2, in operation 211, a terminal of a D2D service provider, D2D SP, may transmit a D2D service registration request message to a D2D server when a D2D service is initiated. In this instance, the D2D service provider may include, in the D2D service registration request message, service information including an identification (ID) of a base station being accessed and a category and a service name of a service provided by the D2D service provider, and may transmit the D2D service registration request message to the D2D server.

In operation 212, when the D2D server receives the D2D service registration request message, the D2D server may allocate an ID to the corresponding service, may store service information, and may transmit a D2D service registration response message the D2D service provider. In this instance, the D2D service registration response message may include a service ID corresponding to the corresponding service category, and the service ID may be used when the D2D service user requests radio resource information for discovery from the base station.

In operation 213, when the D2D service provider is allocated the service ID through the D2D service registration response message, the D2D service provider may transmit, to the base station, a D2D discovery service request message including the corresponding service ID in a form of a non-access stratum (NAS) message in order to be allocated a discovery radio resource for the corresponding service. In operation 214, when the base station receives the D2D discovery service request message from the D2D service provider, the base station may transmit the D2D discovery service request message to a mobility management entity (MME).

In operation 215, when the MME receives the D2D discovery service request message, the MME may transmit a D2D discovery context setup request message to the base station to request the base station to set up a discovery radio bearer for the corresponding D2D service. In this instance, the D2D discovery context setup request message may include a service ID and a D2D discovery bearer ID.

In operation 216, the base station may allocate a discovery radio resource for the corresponding D2D service to the D2D service provider through a D2D discovery radio bearer establishment message, and in operation 217, may transmit a D2D discovery context setup complete message to the MME to inform that resource allocation is completed.

The D2D service provider to which the discovery radio resource for the corresponding D2D service is allocated may broadcast a signal to enable the D2D user to discover the corresponding service through the allocated discovery radio resource.

In a case in which the D2D service provider provides the D2D service while mobile, when a handover occurs from a servicing base station to other base station, a procedure for providing the corresponding discovery service continuously may be necessary. For example, as shown in FIG. 1, when a serving base station or first base station determines a handover of the D2D service provider, the serving base station may transmit, to a target base station or second base station, a handover request message including information necessary for the basic handover and information associated with the D2D discovery service, for example, a service ID and a D2D discovery bearer ID, in operation 221.

In operation 222, the target base station may allocate a discovery radio resource allowing the corresponding D2D service to be maintained and may transmit a handover request acknowledgement message including information associated with the discovery radio resource to the serving base station, and in operation 223, the serving base station may transmit a handover command message including the corresponding information to the D2D service provider.

In operation 224, the D2D service provider may perform a handover to the target base station through a handover complete message, and in operation 225, the target base station may transmit, to the MME, a path switch request message informing that the serving base station is changed.

In operation 226, to reflect the changed base station information on the D2D server, the D2D service provider may transmit a D2D service information update message including the service ID and an ID of the changed base station to the D2D server, and may maintain the D2D discovery service for the corresponding D2D service.

Figure 3:
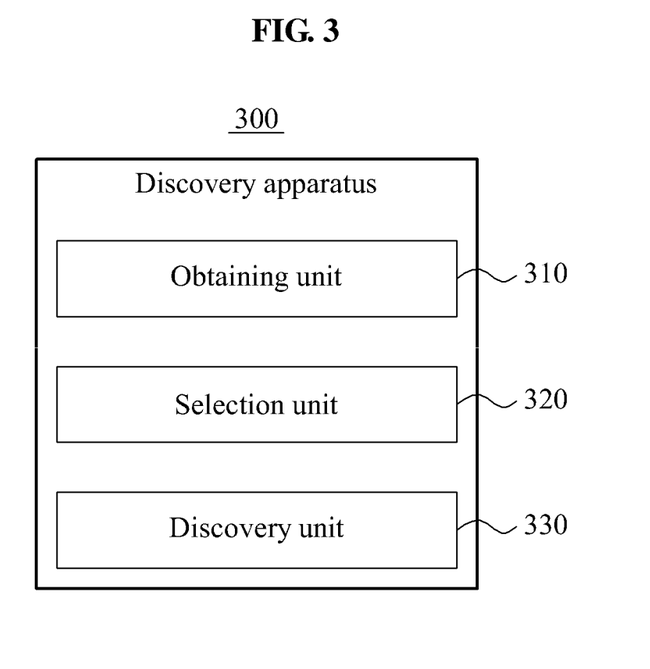
FIG. 3 is a block diagram illustrating a discovery apparatus for discovering a service provided by a D2D service provider according to an exemplary embodiment.

FIG. 3 is a block diagram illustrating a discovery apparatus 300 for discovering a service provided by a D2D service provider according to an exemplary embodiment. Hereinafter, a discovery apparatus for performing discovery of only a desired service among services provided by a plurality of D2D service providers is described with reference to FIG. 3.

Referring to FIG. 3, the discovery apparatus 300 according to an exemplary embodiment may include an obtaining unit 310, a selection unit 320, and a discovery unit 330.

The obtaining unit 310 may obtain, from a server for managing information associated with terminals providing a service using a D2D communication scheme over a mobile communication network, information associated with services provided by the terminals.

The selection unit 320 may select a service of interest based on the information associated with the service obtained by the obtaining unit 310.

For example, when a client for D2D communication included in the discovery apparatus 300 is executed or when a request for obtaining the information associated with the service is input from a user, the obtaining unit 310 may obtain the information associated with the service from the server. For this, although not shown, the discovery apparatus 300 according to an exemplary embodiment may further include a transmission unit to transmit a service information request message requesting the information associated with the service provided by the terminals to the server for managing the information associated with the terminals providing the service using the D2D communication scheme over the mobile communication network, that is, a D2D server. Here, the service information request message may include information associated with a base station ID and a category of the service of interest, and the information associated with the service may correspond to information associated with a service corresponding to the category of the service of interest among services provided through a base station corresponding to the base station ID.

The discovery unit 330 may discover a terminal providing the service of interest based on information associated with a radio resource allocated to the terminal providing the service of interest received from the base station. For this, the transmission unit may transmit, to the base station, a discovery information request message requesting the information associated with the radio resource allocated to the terminal providing the service of interest in a form of an NAS message. Here, the discovery information request message may include information associated with an ID of the service of interest and a category of the service of interest, received from the server.

The discovery information request message may be transmitted from the base station to an MME that may manage a radio bearer for D2D communication between the terminals providing the service using the D2D communication scheme. In this case, the MME may command the base station to provide the information associated with the discovery radio resource allocated to the terminal providing the service of interest to the discovery information request terminal based on the ID of the service of interest.

The discovery unit 330 may discover the terminal providing the service of interest by measuring proximity with the terminal providing the service of interest based on the information associated with the discovery radio resource received from the base station.

When the discovery apparatus 300 performs a handover, the MME may command a target base station to provide the discovery apparatus 300 with the information associated with the discovery radio resource allocated to the terminal providing the service corresponding to the category of the service of interest based on the information associated with the category of the service of interest included in the discovery information request message received from the serving base station. Accordingly, even though a handover occurs, the discovery apparatus 300 may continue to receive the information associated with the discovery radio resource for the category of the service of interest.

Hereinafter, a process of the discovery apparatus 300 for discovering a terminal providing a service of interest is described with reference to FIGS. 4 and 5 through an example.

Figure 4:
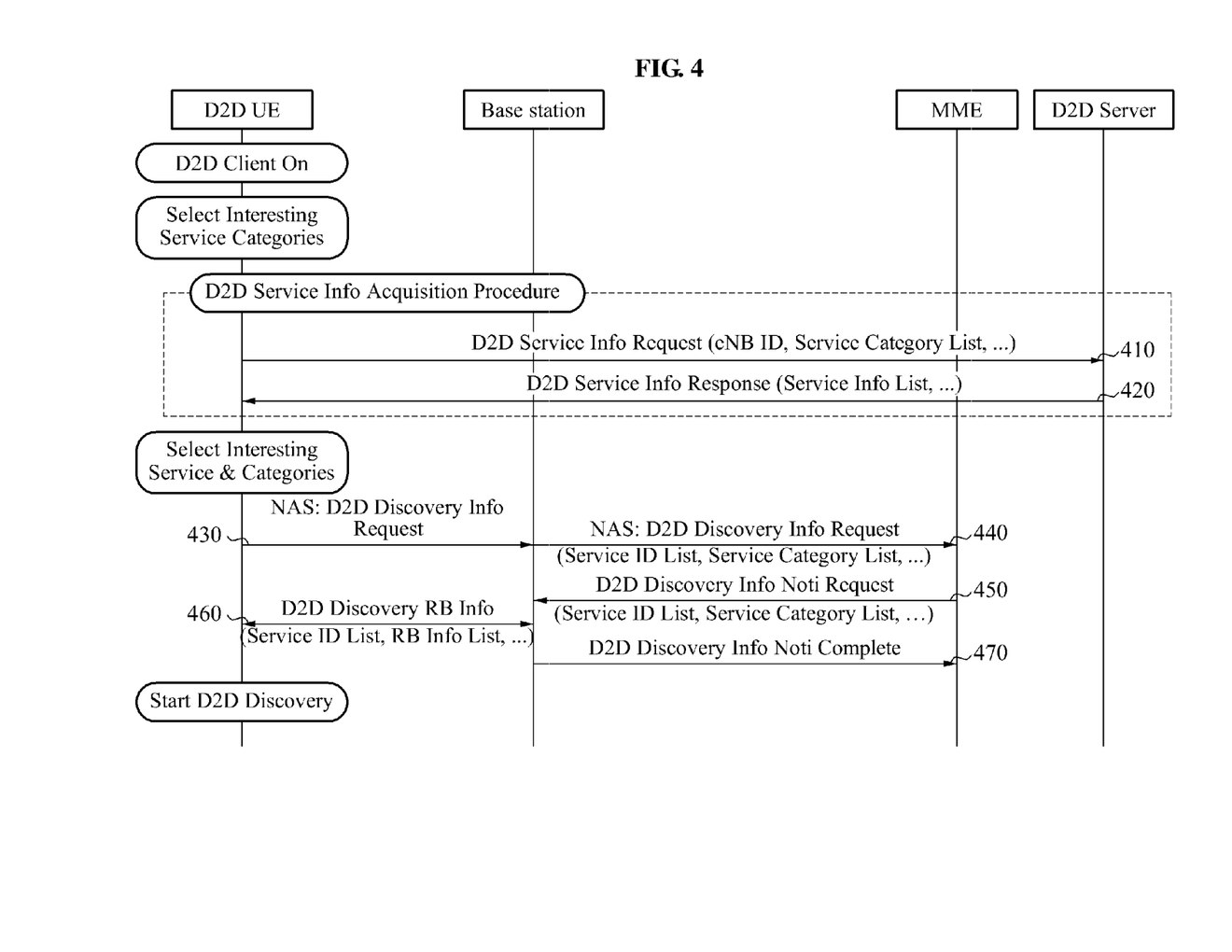
FIG. 4 is a timing diagram illustrating a procedure for obtaining discovery radio resource information for a D2D service, in which a D2D service user is interested, in a cellular mobile communication system according to an exemplary embodiment.

FIG. 4 is a timing diagram illustrating a procedure for obtaining discovery radio resource information for a D2D service, in which a D2D service user is interested, in a cellular mobile communication system according to an exemplary embodiment.

As shown in FIG. 4, a terminal of a D2D user, D2D UE, may receive a selection of a category of a service of interest from a user when a D2D client for receiving a D2D service is executed.

The D2D user may transmit a D2D service information request message to a D2D server to obtain service information of a D2D service provider of interest within a service area of a base station being accessed currently. The D2D service information request message may include a base station ID and a category list of a D2D service of interest.

The D2D server receiving the D2D service information request message may transmit service information corresponding to the category list of the D2D service of interest among D2D service information provided by a corresponding base station based on the base station ID to the D2D user through a D2D service information response message. This D2D service information acquisition procedure 410 and 420 may be performed when the D2D client is executed in the D2D user terminal or when a request is made from the user.

The D2D user obtaining the service information from the D2D server may select a D2D service of interest or other D2D service category based on the service information. However, when the D2D service information acquisition procedure 410 and 420 is not executed, the D2D user may select only a service category of interest.

In operation 430, the D2D user selecting the D2D service of interest and the D2D service category may transmit a D2D discovery information request message in a form of an NAS message to the base station, to obtain D2D discovery radio resource information for receiving the corresponding service. In operation 440, the base station receiving the D2D discovery information request message may transmit the D2D discovery information request message to the MME. In this instance, the D2D discovery information request message may include an ID and a category of the D2D service in which the D2D user is interested, and the MME may transmit a D2D discovery notification request message to enable the base station to provide discovery radio resource information for the corresponding services to the D2D user, in operation 450.

In operation 460, the base station may search for all D2D service IDs provided by the base station based on the D2D discovery notification request message received from the MME and may provide discovery radio resource information allocated to the corresponding D2D service to the D2D user through a D2D discovery radio resource information message, and in operation 470, may transmit a D2D discovery information notification complete message to the MME.

Accordingly, the D2D user obtaining the discovery radio resource information for the D2D service of interest may perform a discovery for only the corresponding service to minimize an amount of battery consumed in discovery.

Figure 5:
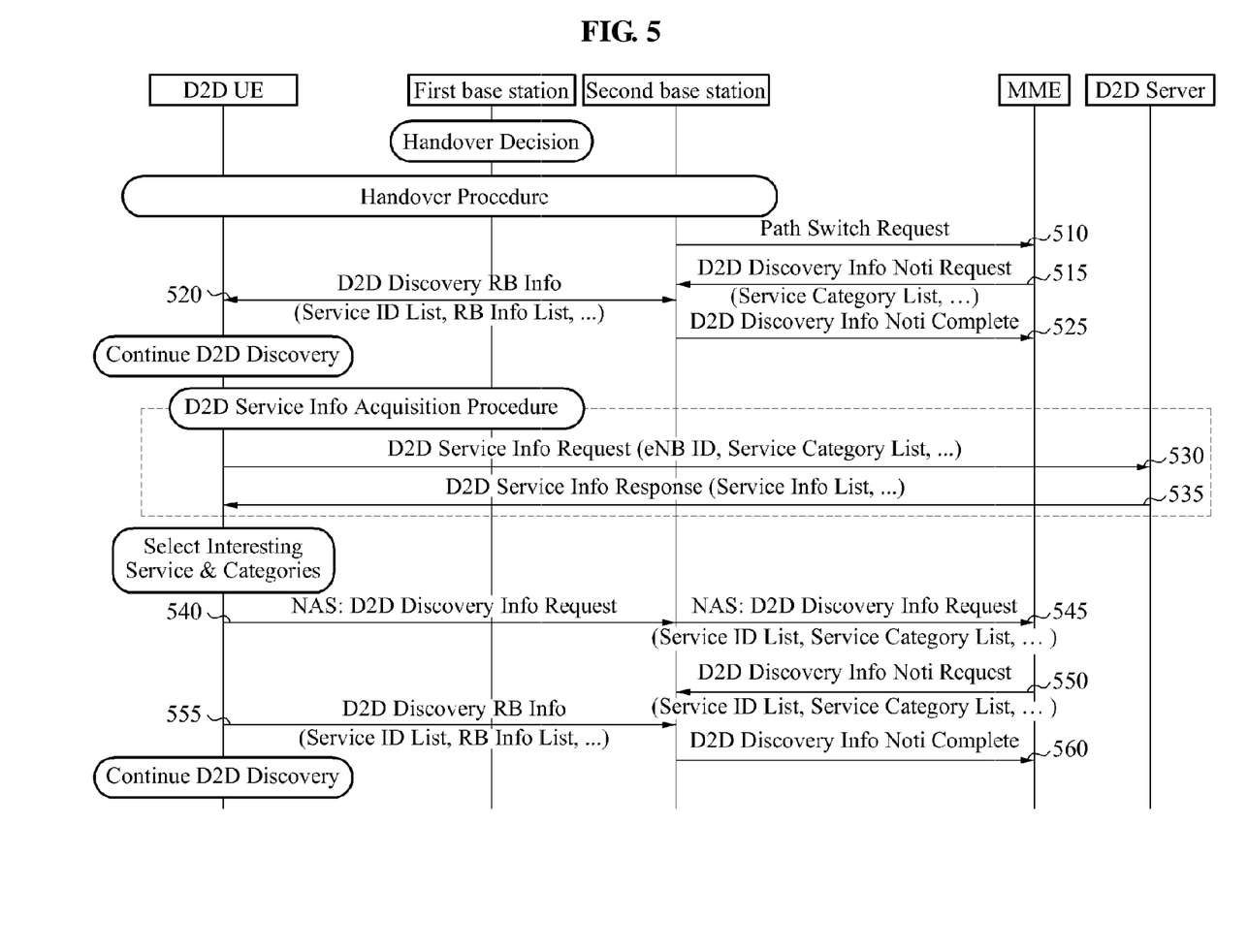
FIG. 5 is a timing diagram illustrating a procedure for performing a D2D service discovery continuously when a handover to other base station occurs with a movement of a D2D service user in a cellular mobile communication system according to an exemplary embodiment.

FIG. 5 is a timing diagram illustrating a procedure for performing a D2D service discovery continuously when a handover to other base station occurs with a movement of a D2D service user in a cellular mobile communication system according to an exemplary embodiment.

As shown in FIG. 5, in operation 510, when a D2D user performs a handover from a first base station to a second base station, an MME may receive a path switch request message from the second base station, and in operation 515, may request the second base station to provide the D2D user with discovery radio resource information for a D2D service corresponding to a service category of interest requested from a previous base station by the D2D user because the MME provides radio resource information for a service category of interest but does not provide radio resource information for a service of interest requested from a previous base station by the D2D user that is not served by the second base station.

In operation 520, the second base station receiving the D2D discovery information notification request message may search for all D2D service IDs corresponding to the service category included in the message and may provide the D2D user with discovery radio resource information for the corresponding D2 service, and in operation 525, may transmit a D2D discovery information notification complete message to the MME. Accordingly, even after handover, the D2D user may enable continuous discovery for the D2D service.

After the handover is completed, a D2D service information acquisition procedure may be performed by transmitting a D2D service information request message from the D2D client to the D2D server periodically or as per a request from the user in operation 530, and by receiving service information corresponding to a category list of the D2D service in which the user is interested from the D2D server in operation 535, and the D2D user may request discovery resource information for the particular D2D service of interest from the second base station in operation 540.

In operation 545, the second base station may transmit, to the MME, the D2D discovery information request message received from the D2D user, and in operation 550, the MME may transmit a D2D discovery notification request message to the second base station to enable the second base station to provide the D2D user with discovery radio resource information for the corresponding services. In operation 555, the second base station may search for all D2D service IDs provided by the second base station based on the D2D discovery notification request message received from the MME and may provide allocated discovery radio resource information corresponding to a corresponding D2D service ID to the D2D user through a D2D discovery resource information message, and in operation 560, may transmit a D2D discovery information notification complete message to the MME so that the D2D user may perform a discovery with minimum battery consumption.

According to the exemplary embodiments, only a terminal of interest may be discovered among terminals providing various services through D2D communication, by obtaining, from a server managing information associated with terminals providing a service using a D2D communication scheme over a mobile communication network, information associated with a service provided by the terminals, selecting a service of interest based on the information associated with the service, receiving, from a base station, information associated with a discovery radio resource allocated to a terminal providing the service of interest, and discovering the terminal providing the service of interest.

According to the exemplary embodiments, because only a terminal of interest is discovered among terminals providing various services through D2D communication, an amount of battery consumption may be reduced remarkably when compared to that of discovery for entire terminals.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A discovery method performed by a discovery apparatus, the discovery method comprising:
    transmitting, to a server, a service information request message requesting information associated with a service provided by one or more terminals;
    obtaining, from the server, managing information associated with the one or more terminals providing the service using a device-to-device (D2D) communication scheme over a mobile communication network, wherein information associated with the service is provided by the one or more terminals;
    selecting a service of interest based on the information associated with the service;
    receiving, from a base station, information associated with a discovery radio resource allocated to a terminal providing the service of interest; and
    discovering the terminal providing the service of interest based on the information associated with the discovery radio resource;
    wherein the service information request message includes information associated with an identification (ID) of the base station and a category of the service of interest.

2. The discovery method of claim 1, wherein the information associated with the service corresponds to information associated with a service corresponding to the category of the service of interest among services provided through the base station corresponding to the ID of the base station.

3. The discovery method of claim 1, wherein the obtaining is performed when a client for D2D communication included in the discovery apparatus is executed or when a request for obtaining the information associated with the service is input from a user.

4. The discovery method of claim 1, further comprising:
    before the receiving,
    transmitting a discovery information request message in a form of a non-access stratum (NAS) message to the base station, the discovery information request message requesting the information associated with the radio resource allocated to the terminal providing the service of interest.

5. The discovery method of claim 4, wherein the discovery information request message includes information associated with an ID of the service of interest and a category of the service of interest received from the server.

6. The discovery method of claim 5, wherein the discovery information request message is transmitted from the base station to a mobility management entity (MME) managing a radio bearer for D2D communication between the terminals providing the service using the D2D communication scheme, and
    the MME requests the base station to provide the discovery apparatus with the information associated with the radio resource allocated to the terminal providing the service of interest, and the base station transmits, to the discovery apparatus, the information associated with the radio resource allocated to the terminal providing the service corresponding to the ID of the corresponding service of interest.

7. The discovery method of claim 6, wherein the information associated with the radio resource is received, in a case in which the discovery apparatus performs a handover from the base station to other base station, by the MME transmitting, to other base station, the information associated with the category of the service of interest included in the discovery information request message received from the base station, and by the base station transmitting, to the discovery apparatus, the information associated with the radio resource allocated to the terminal providing the service corresponding to the category of the service of interest.

8. The discovery method of claim 1, wherein the discovering comprises discovering the terminal providing the service of interest by measuring proximity with the terminal providing the service of interest based on the information associated with the radio resource.

9. A discovery apparatus comprising:
an obtaining unit to obtain, from a server managing information associated with one or more terminals providing a service using a device-to-device (D2D) communication scheme over a mobile communication network, information associated with a service provided by the terminals;
a selection unit to select a service of interest based on the information associated with the service;
a discovery unit to discover a terminal providing the service of interest based on information associated with a discovery radio resource allocated to the terminal providing the service of interest received from a base station; and
a transmission unit to transmit, to the server, a service information request message requesting information associated with the service provided by the terminals;
wherein the service information request message includes information associated with an identification (ID) of the base station and a category of the service of interest, and the information associated with the service corresponds to information associated with a service corresponding to the category of the service of interest among services provided through the base station corresponding to the ID of the base station.

10. The discovery apparatus of claim 9, wherein the obtaining unit obtains the information associated with the service when a client for D2D communication included in the discovery apparatus is executed or when a request for obtaining the information associated with the service is input from a user.

11. The discovery apparatus of claim 9, wherein the transmission unit transmits, to the base station, a discovery information request message in a form of a non-access stratum (NAS) message, the discovery information request message requesting the information associated with the radio resource allocated to the terminal providing the service of interest.

12. The discovery apparatus of claim 11, wherein the discovery information request message includes information associated with an ID of the service of interest and a category of the service of interest received from the server.

13. The discovery apparatus of claim 12, wherein the discovery information request message is transmitted from the base station to a mobility management entity (MME) managing a radio bearer for D2D communication between the terminals providing the service using the D2D communication scheme, and the MME transmits the information associated with the service of interest to the base station, and the base station transmits, to the discovery apparatus, the information associated with the radio resource allocated to the terminal providing the service of interest based on the ID of the service of interest.

14. The discovery apparatus of claim 13, wherein the information associated with the radio resource is received, in a case in which the discovery apparatus performs a handover from the base station to other base station, by the MME transmitting, to other base station, the information associated with the category of the service of interest included in the discovery information request message received from the base station, and by other base station transmitting, to the discovery apparatus, the information associated with the radio resource allocated to the terminal providing the service corresponding to the category of the service of interest based on the information associated with the category of the service of the interest.

15. The discovery apparatus of claim 9, wherein the discovery unit discovers the terminal providing the service of interest by measuring proximity with the terminal providing the service of interest based on the information associated with the radio resource.

* * * * *